Oct. 23, 1928.
G. BAUM
1,688,680
APPARATUS FOR HEATING LIQUIDS BY ELECTRICAL ENERGY
Original Filed Oct. 15, 1925    2 Sheets-Sheet 1
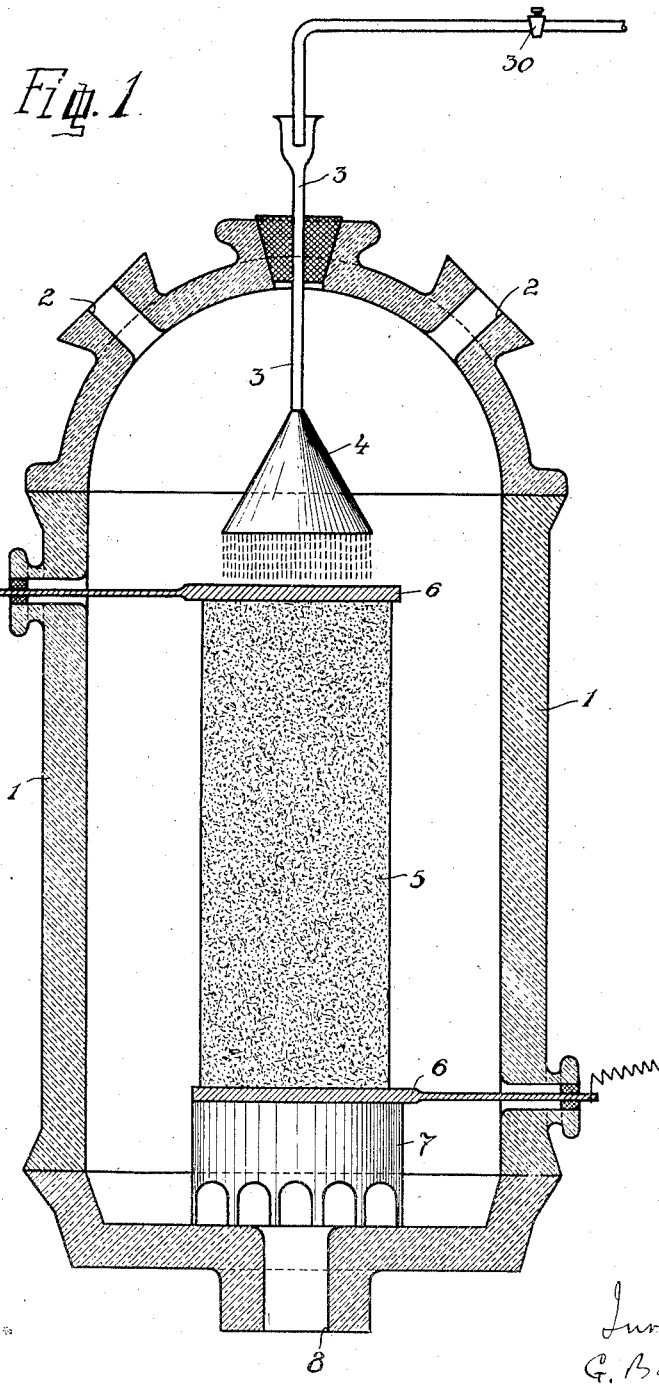

Oct. 23, 1928.
G. BAUM
1,688,680
APPARATUS FOR HEATING LIQUIDS BY ELECTRICAL ENERGY
Original Filed Oct. 15, 1925   2 Sheets-Sheet 2
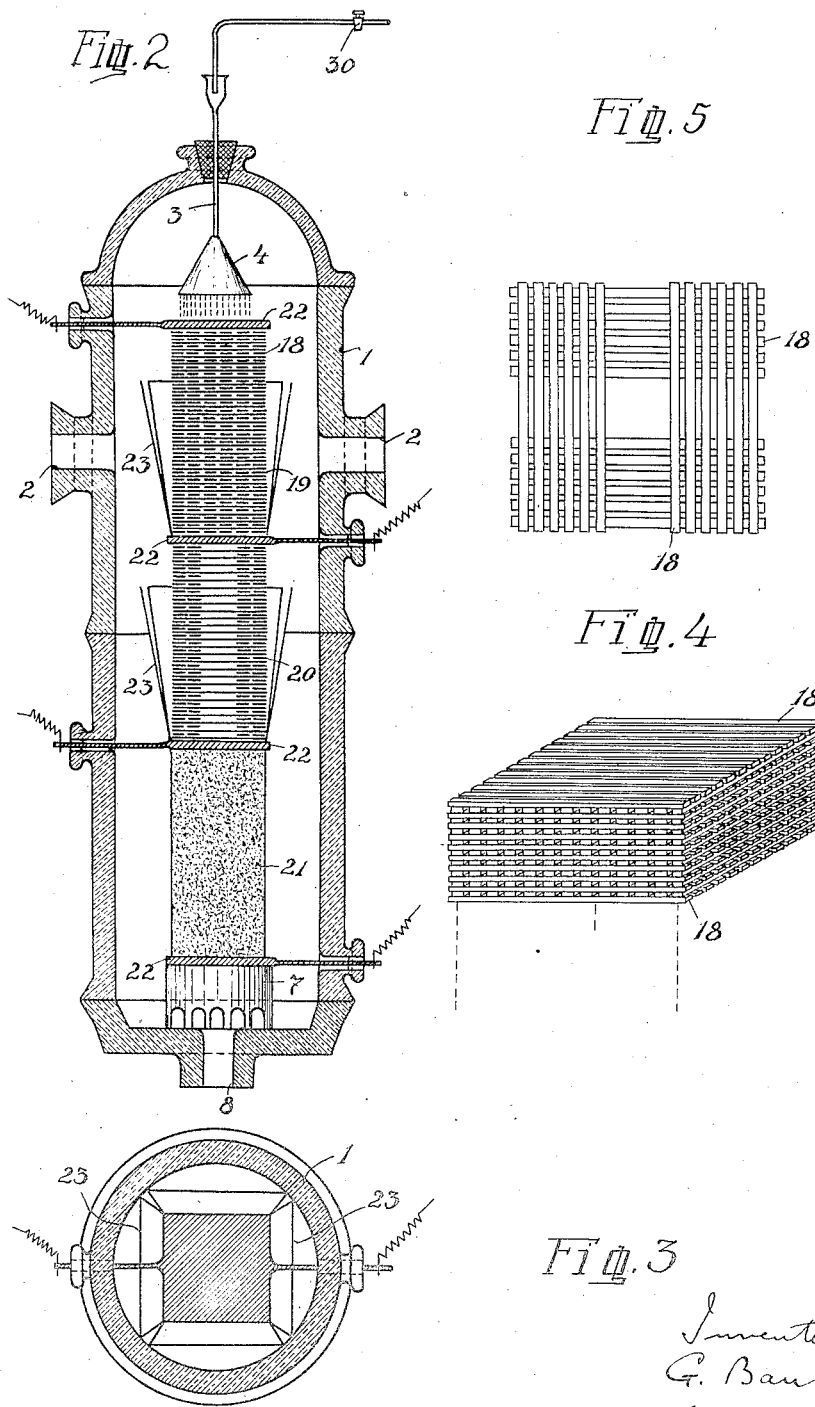

Patented Oct. 23, 1928.

1,688,680

UNITED STATES PATENT OFFICE.

GUSTAV BAUM, OF WEISSENSTEIN-ON-THE-DRAU, KARNTEN, AUSTRIA, ASSIGNOR TO THE NIAGARA ELECTRO CHEMICAL COMPANY, INC., OF NEW YORK, N. Y., A CORPORATION OF NEW YORK.

APPARATUS FOR HEATING LIQUIDS BY ELECTRICAL ENERGY.

Original application filed October 15, 1925, Serial No. 62,602, and in Austria October 28, 1924. Divided and this application filed October 19, 1926. Serial No. 142,581.

This invention relates to an apparatus for electrically heating liquids, which heating may be carried out for any purpose, but particularly for effecting distillation, concentration or chemical reactions and the like, the present application being a division of the co-pending application Serial No. 62,602, filed October 15, 1925, which relates to a process for heating liquids by electrical energy.

According to the process described in this co-pending application the liquid is caused to pass through distributing structures with interstitial spaces in such manner, that these interstitial spaces are filled only partly, no compact closed liquid body causing the rise of hydrostatic pressure being formed, so that the generated gases or vapours can freely escape. According to one method of carrying the invention into practice this is realized by causing the uniformly spread liquid to trickle down over and through some porous material or else over materials—porous or not—piled up in such manner as to leave interstitial spaces between the single pieces, these porous or piled up bodies being placed between the electrodes supplying and leading off the current. This arrangement allows of varying the sectional area of the liquid offered to the current and consequently also its resistance by increasing or diminishing the quantity of liquid spread on said structure.

If the heating is to be carried out for the purpose of distillation or concentration or of provoking chemical reactions, the liquid is subject to continuous alterations regarding temperature composition, concentration, etc., owing to which also its resistance changes. The arrangement according to the present invention offers also the possibility of adjusting the apparatus by graduation to such changes of the state taking place in the course of the treatment. For this purpose the said structure may by means of several suitably disposed electric supply mains (electrodes) be subdivided into several units, elements or components, having interstitial spaces or pores of different size, and if desired, being of different height.

In any of these cases very highly porous bodies may be employed as material of said structure, the advantage being thus obtained, that the heating of the liquid is favorized and supported by an adsorbing action. In general the materials adapted to be used for such structures, may be such, which are not wetted by the liquid or else such as will suck it up, furthermore electrically conductive or non-conductive bodies, the requisite quality being that all these materials at any degree of concentration occurring during the treatment will not be attacked by the liquid or its vapours. As examples of such materials may be named: porcelain, stone-ware, metals, glass, glass-dross and furthermore unglazed ceramic masses, such as filters made of kieselgur (infusorial earth) porous gels, sand etc.

The process admits of a great variety of applications. Organic and inorganic acids can be concentrated by its means, lyes can be concentrated and prepared for crystallization, solutions of all kinds can be reduced, mixtures of liquids separated and reactions (saponification for instance) carried out, whereby, in every instance, the highest possible theoretical output not only of material but also of thermic effect is nearly obtained. The process enables one likewise to effect the highest possible energy and heat concentrations respectively.

Below are given a few suitable apparatus for carrying out the process, as examples of types of construction.

Fig. 1 is a longitudinal section of the apparatus.

Fig. 2 is a longitudinal section of a modification of Fig. 1.

Fig. 3 is a cross section of Fig. 2.

Figs. 4 and 5 are detail views of the porous structure employed in the device shown in Fig. 2.

Figure 1 shows a longitudinal section of a distillation or concentration apparatus, which may be used for instance in order to separate a mixture of aqueous sodium carbonate lye and ammonia and for concentrating the sodium carbonate lye. The jacket 1, which is made of earthenware, porcelain or some similar insulating material is provided with exhausts 2 on the arched lid, for the vapours given out in the process. The column-like structure 5 consists of non-conducting material with large pores, which is resisting to alkali at the temperature reached in the course of the process. Above and below the structure is covered by sieve like carbon electrodes 6, which are used as current leads. The structure is supported by a shell 7 which is made of quartz or similar material and surrounds the discharge pipe 8.

The solution taken through the leading-in pipe 3, is uniformly divided by the watering rose 4 and falls on the upper carbon plate 6 which is made as a sieve and thereby assists in the division. As soon as the solution flowing downwards has reached the lower current carrying plate 6, the circuit is closed. The strength of current depends on the size of the pores of the material used for the structure which must be chosen in accordance with the process in view, and furthermore on the quantity of the liquid spread on the structure per unit of time, which quantity can easily be adjusted by means of the tape 30.

If the apparatus is used solely for concentration and if the vapours given out are harmless, it is possible to dispense with the jacket 1.

If one has to carry out a distillation which involves also a chemical transformation, as occurs for instance when ethyl acetate (acetic ester) is formed from acetic acid and ethyl alcohol, then a corresponding longer heating circuit must be contrived by connecting in series several components (units of structure) which are formed so as to answer the purpose in view. The porous structure and the height of the components must also conform to the duration or to the temperature necessary for each of the different phases of the process. For such difficult conditions, it is advisable to employ instead of inner structures of naturally porous material, structures whose hollow spaces are artificially made by a suitable structural combination of individual components. Figures 2 and 3 give a longitudinal and a cross-section respectively of this type of construction. Figures 4 and 5 deal with details.

As shown in the type of construction given, the components of the inner structures consists of thin glass rods, lying horizontally and piled up into a stack. The rods of one tier are at right angles to the rods of the next tier and the distance between them is such that adhesion prevents the liquid from detaching itself. The intervening spaces of the rods at the centre can, as shown in Figure 5 be made larger, in order to provide channels in the two planes of symmetry through which the gases or vapours given out may be exhausted.

According to Fig. 2 the inner structure consists of three components, viz the two units 19 and 20 consisting of piled up rails (rods) and the third unit 21 consisting of porous material, these single components being separated from one another by carbon plates pierced like sieves. The distance between the rods is different for each of the upper two components, and the height of the components likewise differs, in order to adjust the duration and the strength of heating to each phase of the process.

If the stacking is close and the rods used, thin, narrow ones, one obtains high intensity of current, whereas by using broad, thick, rods and stacking less closely the strength of current is reduced. The height of the component of the inner structures is inversely proportional to the strength of the current.

The handling and the mode of action are similar to those for the first type of construction shown. This apparatus differs from the first type in so far as the uppermost and the middle components are provided with baffle plates, whose function is to return the liquid particles of electrolyte which have been mechanically torn away and thus avoid, in the first place, the losses through splashing. The baffle plates serve at the same time to dephlegmate the outgoing gas and contribute to the concentration of the heat.

If desired, the middle component can be given a special inlet in order to enable one to introduce additional electrolytes. The lowest carbon plate 22 may be dispensed with in certain circumstances. In this case the lowest component carries no current but it is not useless for the process on that account, because the electrolytes are through it given an opportunity of making a longer circuit through the hot distillation chamber, whereby the process may be favorably influenced in certain cases.

In the following claims I use the term "materials or bodies with small interstitial spaces" to include piled or heaped up materials as well as porous bodies of any kind and having pores of any size.

What I claim is:

1. Apparatus for heating liquids by electrical energy, consisting of electric current supply mains and exit lines, structures of non-conducting materials with small interstitial spaces inserted between said lines, and a duct supplying the liquid, the orifice of which duct is placed above the said structures.

2. Apparatus for heating liquids by electrical energy, consisting of electric current supply mains and exit lines, structures of non-conducting materials with small interstitial spaces inserted between said lines, a duct supplying the liquid, the orifice of which duct is placed above the said structures, means for adjusting the admission of liquids and a mantle provided with outlets for the generated gases and vapors.

3. Apparatus for heating liquids by electrical energy, consisting of electric current supply mains and exit lines, structures of non-conducting materials with small interstitial spaces inserted between said lines these structures being subdivided into several elements differing from one another by the size of their interstitial spaces, and a liquid supply duct with its orifice arranged above the structures.

4. Apparatus for heating liquids by electrical energy, consisting of electric current supply mains and exit lines, structures of non-conducting materials with small interstitial spaces inserted between said lines, these structures being subdivided into several elements differing from one another by the size of their interstitial spaces, means for adjusting the liquid supply provided in the liquid admission and a mantle provided with outlets for the generated gases and vapors.

5. Apparatus for heating liquids by electrical energy consisting of electric current supply mains and exit lines, structures inserted between said electric lines, these structures being constituted by rails piled up in layers so, that the rails of one layer cross those of the next, and a liquid supply duct, the orifice of which is placed above said structures.

6. Apparatus for heating liquids by electrical energy consisting of electric current supply mains and exit lines, structures inserted between said electric lines, these structures being constituted by rails piled up in layers so, that the rails of one layer cross those of the next and a liquid supply duct provided with means for regulating the supply of liquid.

7. Apparatus for heating liquids by electrical energy consisting of electric current supply mains and exit lines, structures inserted between said electric lines, these structures being constituted by rails piled up in layers so, that the rails of one layer cross those of the next and a mantle of insulating material with outlets for the generated gases and vapors.

8. Apparatus for heating liquids by electrical energy consisting of electric current supply mains and exit lines, structures inserted between said electric lines, these structures being constituted by rails piled up in layers so, that the rails of one layer cross those of the next and that the middle rails of each layer are more distant from one another than the others, and a liquid supply duct, the orifice of which is placed above said structures.

9. Apparatus for heating liquids by electrical energy consisting of electric current supply mains and exit lines, structures inserted between said electric lines, these structures being constituted by rails piled up in layers so, that the rails of one layer cross those of the next and that the middle rails of each layer are more distant from one another than the others, and means for adjusting the liquid supply provided in the liquid admission duct.

10. Apparatus for heating liquids by electrical energy consisting of electric current supply mains and exit lines, structures inserted between said electric lines, these structures being constituted by rails piled up in layers so, that the rails of one layer cross those of the next and that the middle rails of each layer are more distant from one another than the others, and a mantle with outlets for the generated gases and vapors.

11. Apparatus for heating liquids by electrical energy, consisting of electric current supply mains and exit lines, structures of materials with small interstitial spaces inserted between said lines and baffle plates adapted for leading spilled particles of the liquid back into the structures.

12. Apparatus for heating liquids by electrical energy, consisting of electric current supply mains and exit lines, structure of insulating material with small interstitial spaces inserted between said lines, a rose head connected to the liquid supply duct, which rose head is placed above said structures and a mantle provided with outlets for the generated gases and vapors.

13. Apparatus comprising a non-conducting structure, having interstitial spaces, porous conducting means adjacent thereto, means for supplying electric current to said conducting means and means for supplying liquid to the composite structure.

14. Apparatus comprising a porous non-conducting structure, porous conducting means adjacent thereto, means for supplying electric current to said conducting means and means for supplying liquid to the composite structure.

15. Apparatus comprising a porous non-conducting structure, between porous conducting means, electric current supply means attached to said conducting means and a liquid supply means above the composite structure.

16. Apparatus comprising a non-conducting structure having interstitial spaces inserted between porous conducting means, electric current supply means attached to said conducting means and a liquid supply means above the composite structure.

In testimony whereof I have affixed my signature.

GUSTAV BAUM.